US011280673B2

(12) United States Patent
Huang

(10) Patent No.: US 11,280,673 B2
(45) Date of Patent: Mar. 22, 2022

(54) PHOTODETECTION APPARATUS LESS SUSCEPTIBLE TO INTERFERENCE FROM ENVIRONMENTAL LIGHT

(71) Applicant: SHANGHAI HARVEST INTELLIGENCE TECHNOLOGY CO., LTD., Shanghai (CN)

(72) Inventor: Jiandong Huang, Shanghai (CN)

(73) Assignee: SHANGHAI HARVEST INTELLIGENCE TECHNOLOGY CO., LTD., Shanghai (CN)

( * ) Notice: Subject to any disclaimer, the term of this patent is extended or adjusted under 35 U.S.C. 154(b) by 30 days.

(21) Appl. No.: 16/769,409

(22) PCT Filed: Dec. 4, 2018

(86) PCT No.: PCT/CN2018/119039
§ 371 (c)(1),
(2) Date: Jun. 3, 2020

(87) PCT Pub. No.: WO2019/109896
PCT Pub. Date: Jun. 13, 2019

(65) Prior Publication Data
US 2020/0300696 A1 Sep. 24, 2020

(30) Foreign Application Priority Data
Dec. 5, 2017 (CN) .......................... 201711271086.1

(51) Int. Cl.
*G01J 1/46* (2006.01)
*G01J 1/44* (2006.01)
(52) U.S. Cl.
CPC . *G01J 1/46* (2013.01); *G01J 1/44* (2013.01); *G01J 2001/446* (2013.01)

(58) Field of Classification Search
CPC .......... G01J 1/46; G01J 1/44; G01J 2001/446; G01J 2001/444
See application file for complete search history.

(56) References Cited

U.S. PATENT DOCUMENTS 5,751,005 A * 5/1998 Wyles ............... H01L 27/14652
250/370.06
2006/0027736 A1 2/2006 Ichino et al.
(Continued)

FOREIGN PATENT DOCUMENTS

| CN | 101952981 A | 1/2011 |
| CN | 101996619 A | 3/2011 |

(Continued)

OTHER PUBLICATIONS

International Search Report issued in PCT/CN2018/119039 (PCT/ISA/210), dated Feb. 27, 2019.
(Continued)

*Primary Examiner* — Jennifer D Bennett
(74) *Attorney, Agent, or Firm* — Birch, Stewart, Kolasch & Birch, LLP

(57) ABSTRACT

A photodetection apparatus includes at least one photodetection cell, each of which includes a first photodiode, a first switch, a capacitor, a second switch and a cancellation circuit. The first photodiode is to receive incident light, and converts the incident light received thereby into a first photocurrent. The cancellation circuit includes a second photodiode that is to receive the incident light and that converts the incident light received thereby into a second photocurrent. The cancellation circuit cooperates with the first photodiode and the first and second switches to adjust a residual electric quantity of the capacitor to a value correlated to a magnitude difference between the first and second photocurrents.

16 Claims, 15 Drawing Sheets

(56) References Cited

U.S. PATENT DOCUMENTS

| | | |
|---|---|---|
| 2010/0253616 A1 | 10/2010 | Omi et al. |
| 2011/0032229 A1 | 2/2011 | Matsuki |
| 2011/0260041 A1 | 10/2011 | Machida |
| 2011/0260629 A1* | 10/2011 | Uedaira ................ G01J 1/4204 |
| | | 315/158 |
| 2013/0043399 A1 | 2/2013 | Rohr et al. |
| 2017/0005508 A1 | 1/2017 | Utsunomiya et al. |
| 2021/0199497 A1* | 7/2021 | Shi ........................... G01J 1/46 |

FOREIGN PATENT DOCUMENTS

| | | |
|---|---|---|
| CN | 102261953 A | 11/2011 |
| CN | 103038666 A | 4/2013 |
| CN | 106325551 A | 1/2017 |
| JP | 2006-54507 A | 2/2006 |

OTHER PUBLICATIONS

Written Opinion of the International Searching Authority issued in PCT/CN2018/119039 (PCT/ISA/237), dated Feb. 27, 2019.

* cited by examiner

PHOTODETECTION APPARATUS LESS SUSCEPTIBLE TO INTERFERENCE FROM ENVIRONMENTAL LIGHT

FIELD

The disclosure relates to a detection apparatus, and more particularly to a photodetection apparatus.

BACKGROUND

Referring to FIGS. 1 and 2, a conventional photodetection apparatus 4 includes a photodetection sensor 41 and a readout element 42. The photodetection sensor 41 includes a plurality of photodetection cells 411. The readout element 42 includes a plurality of readout cells 421. Each of the photodetection cells 411 is coupled to a respective one of the readout cells 421 via a respective connecting line 43, and cooperates with the respective one of the readout cells 421 to form a respective single-pixel photodetection circuit 44.

For each photodetection circuit 44, the photodetection cell 411 includes a photodiode 412, a capacitor 413 and a switch 414; and the readout cell 421 includes an integrator 422 and an analog-to-digital converter 423. The photodiode 412 has an anode, and a cathode that is used to receive a reference voltage. The photodiode 412 is used to receive incident light, and converts the incident light received thereby into a photocurrent that flows from its cathode to its anode and that has a magnitude correlated to illuminance of the incident light received thereby. The capacitor 413 is coupled between the anode of the photodiode 412 and ground, and is for receiving the photocurrent from the anode of the photodiode 412 to store charges. The switch 414 (e.g., a thin film transistor) has a first terminal that is coupled to the anode of the photodiode 412, a second terminal that is coupled to the respective connecting line 43, and a control terminal that is coupled to a respective control line 45 for receiving a respective control signal. The switch 414 periodically switches between conduction and non-conduction based on the respective control signal. The integrator 422 is coupled to the respective connecting line 43, is for receiving an output current provided by the capacitor 413 via the switch 414 and the respective connecting line 43 when the switch 414 conducts, and integrates the output current to generate an integrated voltage. The analog-to-digital converter 423 is coupled to the integrator 422 for receiving the integrated voltage therefrom, and converts the integrated voltage into a digital output. Variation of the digital output during a conduction time of the switch 414 is correlated to the illuminance of the incident light received by the photodiode 412.

The conventional photodetection apparatus is susceptible to interference from environmental light, and has a signal-to-noise ratio (SNR) that decreases with increase of illuminance of the environmental light Hence, the conventional photodetection apparatus is primarily used in a darkroom to detect X-ray, and cannot be integrated into a touch display panel to make the touch display panel have a photodetection function, especially contact physiological feature recognition with high precision.

SUMMARY

Therefore, an object of the disclosure is to provide a photodetection apparatus that can alleviate the drawback of the prior art.

According to an aspect of the disclosure, the photodetection apparatus includes a photodetection sensor. The photodetection sensor includes at least one photodetection cell. Each of the at least one photodetection cell includes a first photodiode, a first switch, a capacitor, a second switch and a cancellation circuit. The first photodiode has an anode and a cathode, is used to receive incident light, and converts the incident light received thereby into a first photocurrent. The first switch has a first terminal that is coupled to the anode of the first photodiode, and a second terminal. The capacitor is coupled between the second terminal of the first switch and ground. The second switch has a first terminal that is coupled to the second terminal of the first switch, and a second terminal. The cancellation circuit is coupled to one of the anode of the first photodiode and the second terminal of the first switch, and includes a second photodiode that is used to receive the incident light and that converts the incident light received thereby into a second photocurrent. The cancellation circuit cooperates with the first photodiode and the first and second switches to adjust a residual electric quantity of the capacitor to a value correlated to a magnitude difference between the first and second photocurrents.

According to another aspect of the disclosure, the photodetection apparatus includes a photodetection sensor and a readout element. The photodetection sensor includes at least one photodetection cell. Each of the at least one photodetection cell includes a first photodiode, a first switch, a first capacitor, a second switch, a second photodiode, a third switch, a second capacitor and a fourth switch. The first photodiode has an anode and a cathode, is used to receive incident light, and converts the incident light received thereby into a first photocurrent. The first switch has a first terminal that is coupled to the anode of the first photodiode, and a second terminal. The first capacitor is coupled between the second terminal of the first switch and ground. The second switch has a first terminal that is coupled to the second terminal of the first switch, and a second terminal. The second photodiode has an anode and a cathode, is used to receive the incident light, and converts the incident light received thereby into a second photocurrent. The third switch has a first terminal that is coupled to the anode of the second photodiode, and a second terminal. The second capacitor is coupled between the second terminal of the third switch and ground. The fourth switch has a first terminal that is coupled to the second terminal of the third switch, and a second terminal. The readout element includes at least one readout cell. Each of the at least one readout cell is coupled to the second terminals of the second and fourth switches of a respective one of the at least one photodetection cell, and generates a digital output related to a magnitude difference between the first and second photocurrents of the respective one of the at least one photodetection cell.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
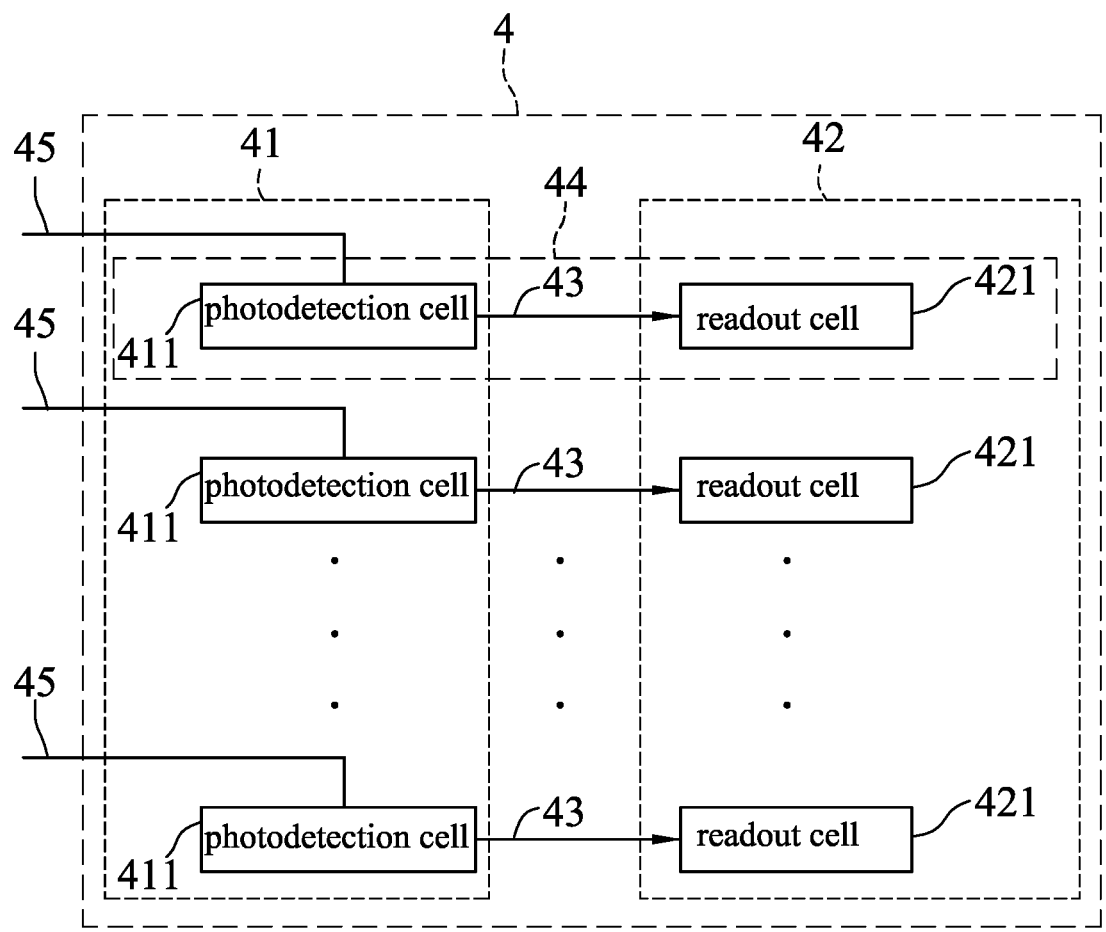
FIG. 1 is a block diagram illustrating a conventional photodetection apparatus.
Figure 2:
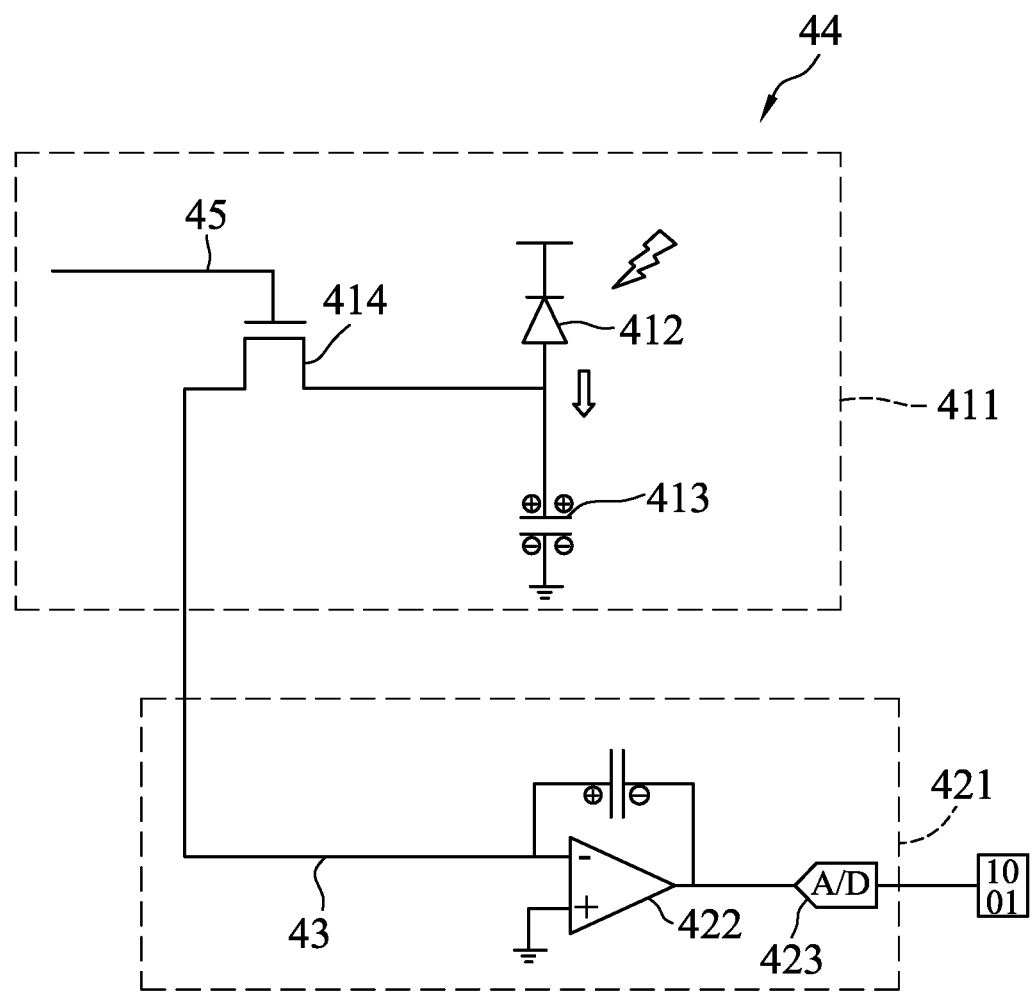
FIG. 2 is a circuit diagram illustrating a photodetection circuit of the conventional photodetection apparatus.

Before the disclosure is described in greater detail, it should be noted that where considered appropriate, reference numerals or terminal portions of reference numerals have been repeated among the figures to indicate corresponding or analogous elements, which may optionally have similar characteristics. In addition, it should be noted that throughout the disclosure, each current may have a positive magnitude or a negative magnitude, with the positive and negative magnitudes indicating opposite directions of the current. When a component receives a current with the positive magnitude, the current flows into the component; and when the component receives the current with the negative magnitude, the current flows out of the component. Moreover, it should be noted that throughout the drawings, the direction of each current when having the positive magnitude is shown by a corresponding arrow.

Figure 3:
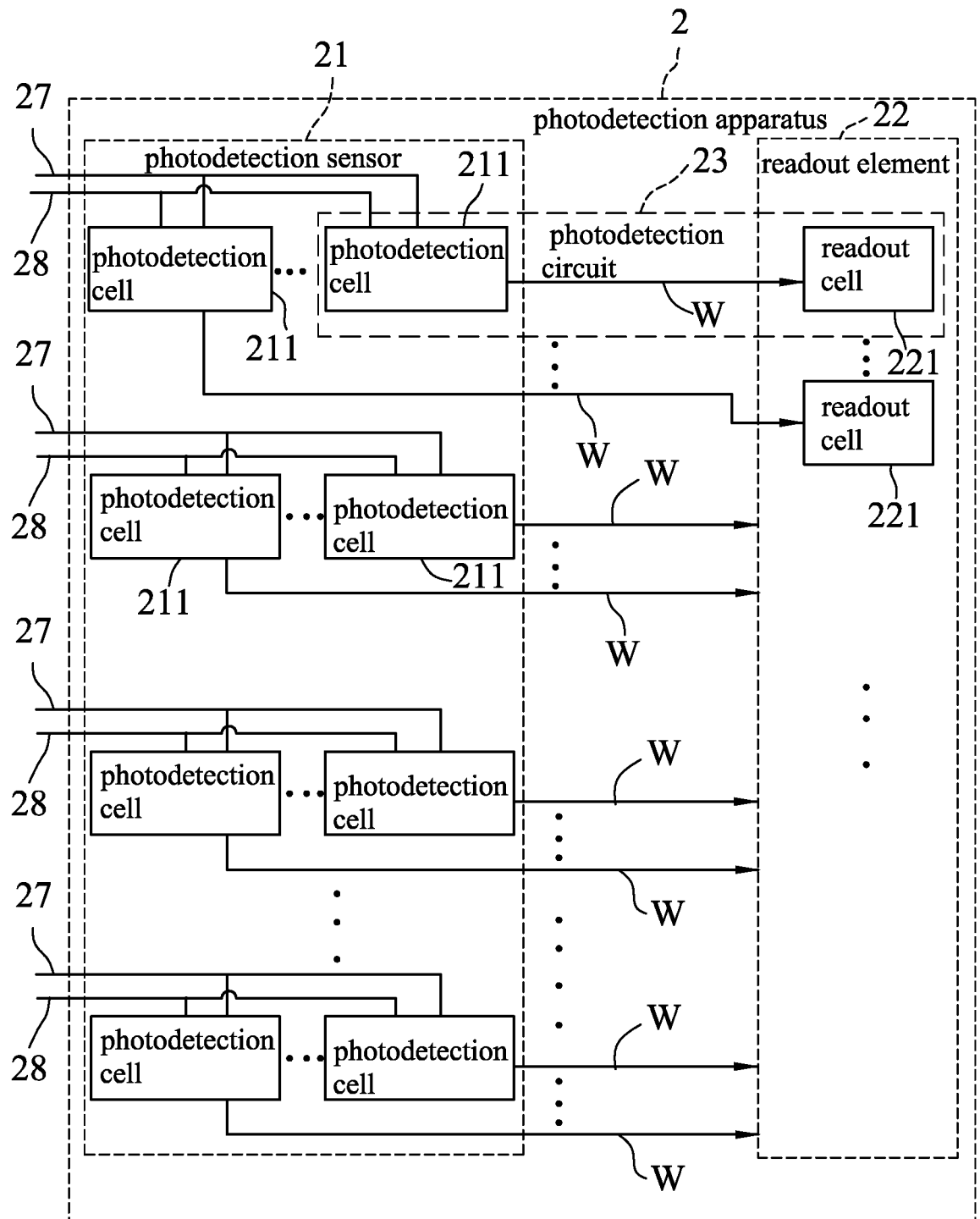
FIG. 3 is a block diagram illustrating a first embodiment of a photodetection apparatus according to the disclosure.

Referring to FIG. 3, a first embodiment of a photodetection apparatus 2 according to the disclosure includes a photodetection sensor 21 and a readout element 22. The photodetection sensor 21 includes a number (P×Q) of photodetection cells 211, where P≤1 and Q≤1. The readout element 22 includes a number (P×Q) of readout cells 221. Each of the photodetection cells 211 is coupled to a respective one of the readout cells 221 via a respective connecting line (W), and cooperates with the respective one of the readout cells 221 to form a respective single-pixel photodetection circuit 23. Therefore, the photodetection apparatus 2 of this embodiment has a resolution of P×Q pixels. The photodetection cells 211 are controlled via a number (P) of first control lines 27 and a number (P) of second control lines 28.

Figure 4:
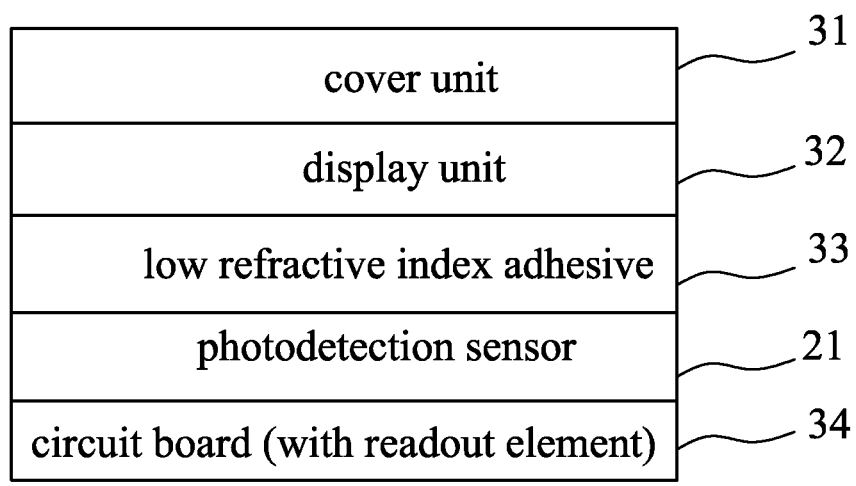
FIG. 4 is a schematic diagram illustrating application of the first embodiment in a touch display panel.

Referring to FIGS. 3 and 4, the photodetection apparatus 2 of this embodiment can be integrated into a touch display panel that is applied in a portable device (e.g., a mobile phone, a tablet, a personal digital assistant (PDA) or the like) or a non-portable device (e.g., a personal computer, an industrial computer or the like), but the disclosure is not limited thereto. The touch display panel includes, from top to bottom, a cover unit 31, a display unit 32 (e.g., an active matrix organic light emitting diode (AMOLED) display or a micro light emitting diode (μLED) display), a low refractive index adhesive 33, the photodetection sensor 21 of this embodiment, and a circuit board 34 with the readout element 22 of this embodiment. Therefore, the touch display panel has both a display function and a photodetection function (e.g., physiological feature recognition).

Figure 5:
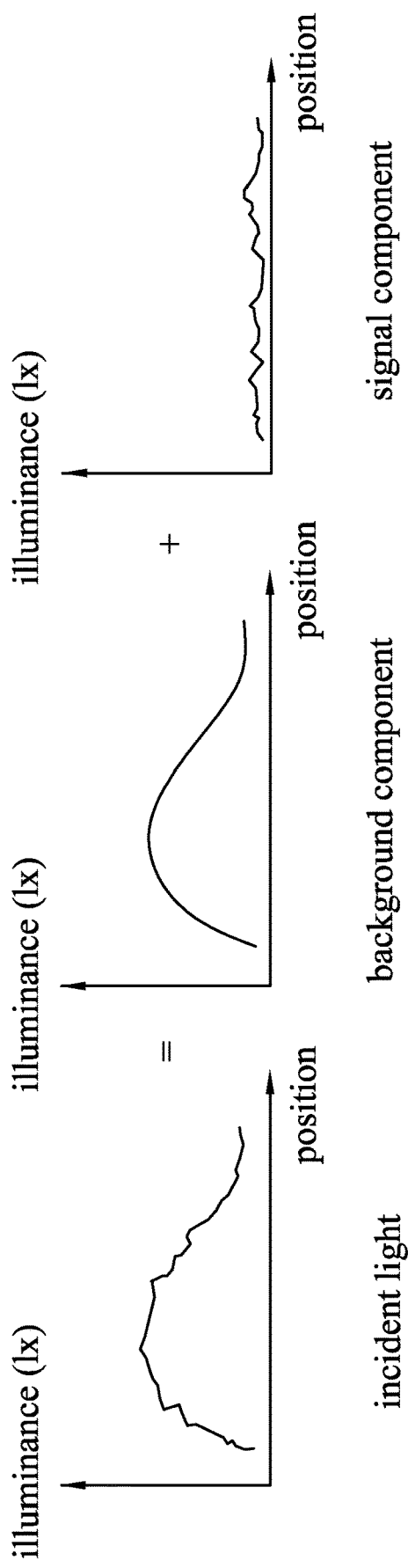
FIG. 5 is a plot illustrating incident light received by the first embodiment.

In application, light emitted by the display unit 32 and penetrating the cover unit 31 is reflected by an object (e.g., a finger or a head) (not shown) contacting or near the cover unit 31; and the reflected light and environmental light penetrate the cover unit 31, the display unit 32 and the low refractive index adhesive 33, and enter the photodetection sensor 21. Therefore, incident light received by the photodetection sensor 21 includes a background component and a signal component as shown in FIG. 5. The background component is contributed by the environmental light. The signal component is contributed by the light emitted by the display unit 32 and reflected by the object, and carries data of the object (e.g., a fingerprint or facial features). In a scenario where the touch display panel is applied in contact fingerprint recognition, illuminance of the signal component is non-zero at positions in a projection of the finger on the photodetection sensor 21, and is greater at positions corresponding to raised portion of epidermis of the finger than at positions corresponding to recessed portion of the epidermis of the finger; and illuminance of the background component is generally greater than the illuminance of the signal component at positions in and near a periphery of the projection.

In an example, the low refractive index adhesive 33 (e.g., an organic compound adhesive including a carbon-fluorine bond) has a refractive index smaller than 1.4, and therefore the incident light enters the photodetection sensor 21 along a direction that is close to a normal line of the photodetection sensor 21.

Figure 6:
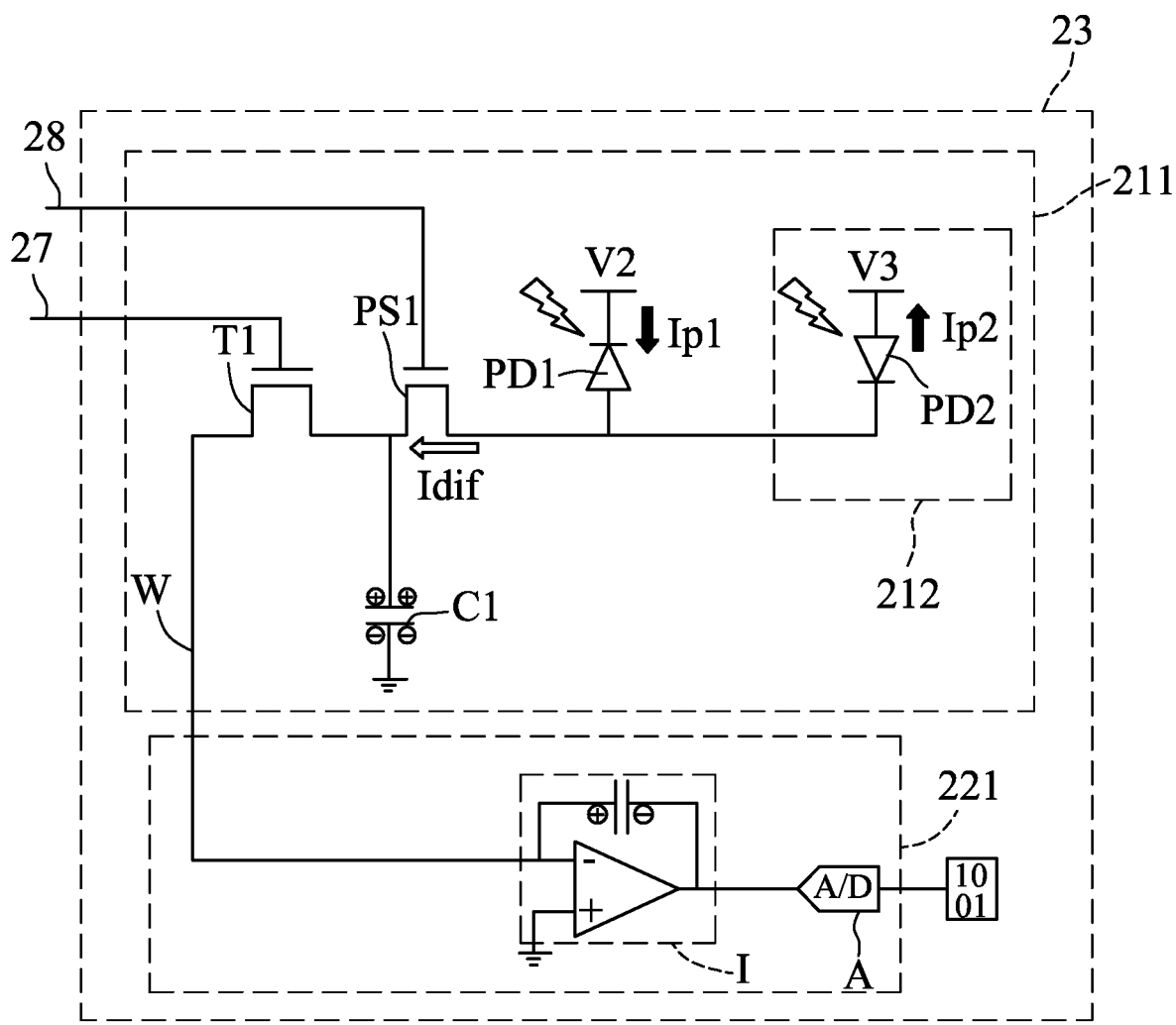
FIG. 6 is a circuit diagram illustrating a photodetection circuit of the first embodiment.

Referring to FIGS. 3 and 6, for each photodetection circuit 23, the photodetection cell 211 includes a first photodiode (PD1), a first switch (PS1), a first capacitor (C1), a second switch (T1) and a cancellation circuit 212; and the readout cell 221 includes an integrator (I) and an analog-to-digital converter (A). The first photodiode (PD1) has an anode, and a cathode that is used to receive a reference voltage (V2). The first switch (PS1) (e.g., a thin film transistor (TFT)) has a first terminal that is coupled to the anode of the first photodiode (PD1), a second terminal, and a control terminal that is coupled to a corresponding one of the second control lines 28. The first capacitor (C1) is coupled between the second terminal of the first switch (PS1) and ground. The second switch (T1) (e.g., a TFT) has a first terminal that is coupled to the second terminal of the first switch (PS1), a second terminal that is coupled to the respective connecting line (W), and a control terminal that is coupled to a corresponding one of the first control lines 27. The cancellation circuit 212 includes a second photodiode (PD2). The second photodiode (PD2) has an anode that used to receive a reference voltage (V3), and a cathode that is coupled to the anode of the first photodiode (PD1). The reference voltages (V2, V3) are set in such a way that the first and second photodiodes (PS1, PS2) are reversely biased and operate in a photoconductive mode. The first photodiode (PD1) is used to receive the incident light, and converts the incident light received thereby into a first photocurrent (Ip1) that flows from its cathode to its anode and that has a positive magnitude correlated to illuminance of the incident light received thereby. The second photodiode (PD2) is used to receive the incident light, and converts the incident light received thereby into a second photocurrent (Ip2) that flows from its cathode to its anode and that has a positive magnitude correlated to illuminance of the incident light received thereby. The cancellation circuit 212 cooperates with the first photodiode (Pd1) and the first and second switches (PS1, T1) to adjust a residual electric quantity of the first capacitor (C1) to a value correlated to a magnitude difference between the first and second photocurrents (Ip1, Ip2). The integrator (I) is coupled to the respective connecting line (W), is for receiving an output current provided by the first capacitor (C1), and integrates the output current to generate an integrated voltage. The analog-to-digital converter (A) is coupled to the integrator (I) for receiving the integrated voltage therefrom, and converts the integrated voltage into a digital output.

In particular, for each photodetection circuit 23, the photodetection cell 211 cyclically operates in a first state (where the first switch (PS1) conducts while the second switch (T1) does not conduct) and a second state (where the first switch (PS1) does not conduct while the second switch (T1) conducts).

In the first state, the first capacitor (C1) receives a difference current (Idif) (which has a magnitude equal to the magnitude of the first photocurrent (Ip1) minus the magnitude of the second photocurrent (Ip2)) via the conducting first switch (PS1) to store charges; a voltage at the second terminal of the first switch (PS1) has a positive magnitude when the first photocurrent (Ip1) is greater than the second photocurrent (Ip2) in magnitude, and has a negative magnitude when the first photocurrent (Ip1) is smaller than the second photocurrent (Ip2) in magnitude; and the residual electric quantity of the first capacitor (C1) is correlated to the magnitude difference between the first and second photocurrents (Ip1, Ip2).

In the second state, the integrator (I) receives the output current from the first capacitor (C1) via the conducting second switch (T1), and integrates the output current to generate the integrated voltage; the integrated voltage has a magnitude that decreases when the voltage at the second terminal of the first switch (PS1) has the positive magnitude, and that increases when the voltage at the second terminal of the first switch (PS1) has the negative magnitude; and a magnitude variation of the integrated voltage during the second state is correlated to the residual electric quantity of the first capacitor (C1) at the end of the first state.

Therefore, under the circumstance where the photodetection cell 211 operates in the second state, the digital output decreases when the first photocurrent (Ip1) is greater than the second photocurrent (Ip2) in magnitude, increases when the first photocurrent (Ip1) is smaller than the second photocurrent (Ip2) in magnitude, and a variation thereof during the second state is correlated to the magnitude difference between the first and second photocurrents (Ip1, Ip2). In this embodiment, a distance between the first and second photodiodes (PS1, PS2) is rather short, and therefore a component of the first photocurrent (Ip1) contributed by the background component of the incident light is substantially equal to a component of the second photocurrent (Ip2) contributed by the background component of the incident light, causing the variation of the digital output during the second state to be substantially irrelevant to the background component of the incident light.

It should be noted that each of the readout cells 221 may be a general purpose integrated circuit or an application specific integrated circuit (ASIC), and details thereof can be found in an article by M. J. Powell, I. D. French, J. R. Hughes, N. C. Bird, O. S. Davies, C. Glasse and J. E. Curran, entitled "Amorphous Silicon Image Sensor Arrays," in Material Research Society Symposium Proceedings, vol. 258, pp. 1127-1137, 1992, and in a book by B. Razavi, "Design of Analog CMOS Integrated Circuits," McGraw-Hill, 2001.

Figure 7:
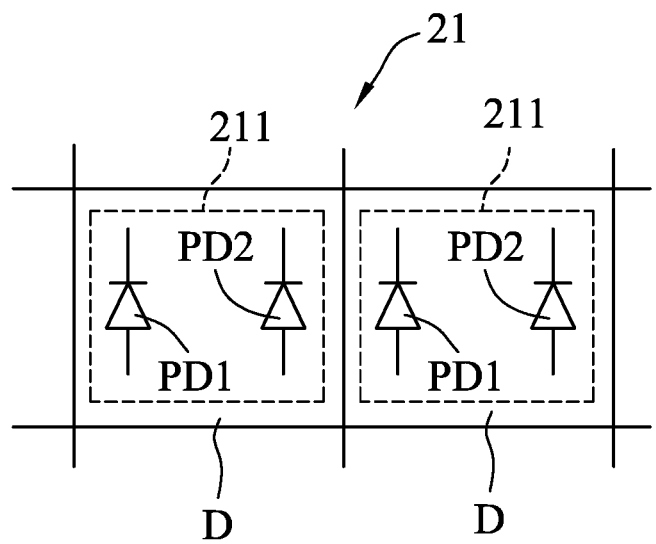
FIG. 7 is a schematic diagram illustrating a first arrangement of photodiodes of the first embodiment.
Figure 8:
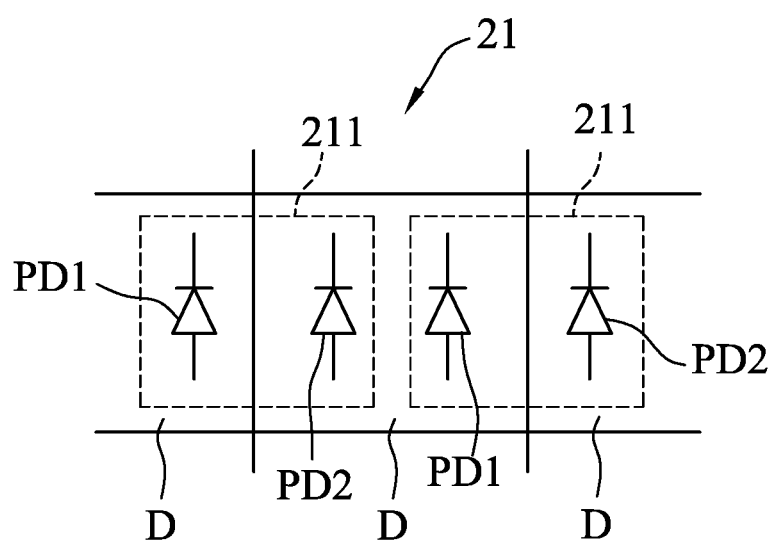
FIG. 8 is a schematic diagram illustrating a second arrangement of the photodiodes of the first embodiment.
Figure 9:
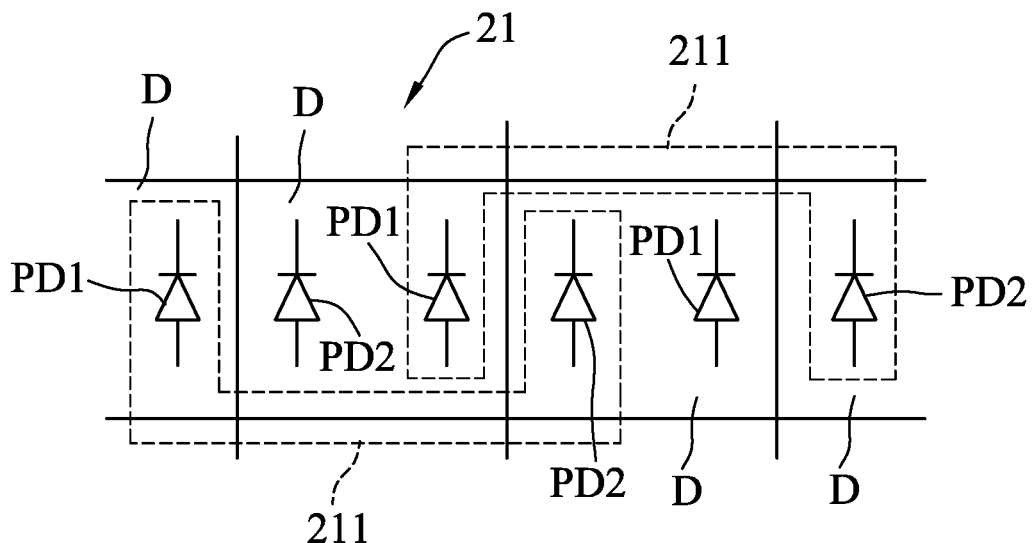
FIG. 9 is a schematic diagram illustrating a third arrangement of the photodiodes of the first embodiment.
Figure 10:
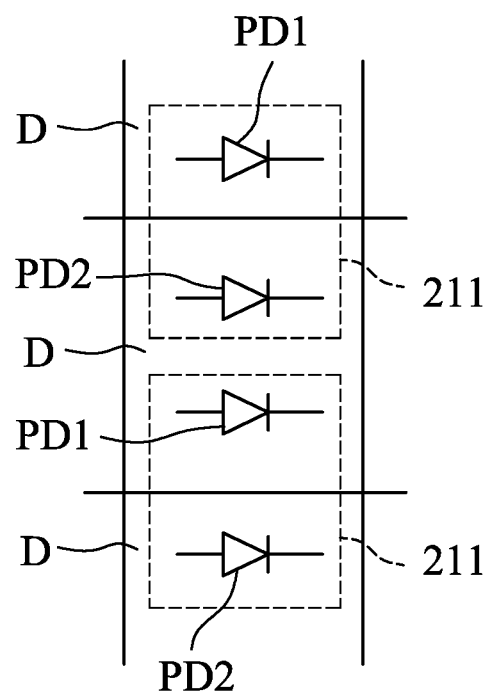
FIG. 10 is a schematic diagram illustrating a fourth arrangement of the photodiodes of the first embodiment.

Referring to FIG. 7, the photodetection sensor 21 may be divided into a number (P×Q) of detection regions (D) arranged in a number (P) of rows and a number (Q) of columns, and the first and second photodiodes (PD1, PD2) of each of the photodetection cells 211 may be disposed in a respective one of the detection regions (D). Referring to FIG. 8, alternatively, the photodetection sensor 21 may be divided into a number (P×(Q+1)) of detection regions (D) arranged in a number (P) of rows and a number (Q+1) of columns, and the first and second photodiodes (PD1, PD2) of a $((p-1)\times Q+q)^{th}$ one of the photodetection cells 211 may be respectively disposed in the detection region (D) at a $p^{th}$ one of the rows and a $q^{th}$ one of the columns and the detection region (D) at the $p^{th}$ one of the rows and a $(q+1)^{th}$ one of the columns, where $1 \leq p \leq P$ and $1 \leq q \leq Q$. Referring to FIG. 9, alternatively, the photodetection sensor 21 may be divided into a number (P×(Q+2)) of detection regions (D) arranged in a number (P) of rows and a number (Q+2) of columns, and the first and second photodiodes (PD1, PD2) of a $((p-1)\times Q+q)^{th}$ one of the photodetection cells 211 may be respectively disposed in the detection region (D) at a $p^{th}$ one of the rows and a $q^{th}$ one of the columns and the detection region (D) at the $p^{th}$ one of the rows and a $(q+2)^{th}$ one of the columns, where $1 \leq p \leq P$ and $1 \leq q \leq Q$. Referring to FIG. 10, alternatively, the photodetection sensor 21 may be divided into a number ((P+1)×Q) of detection regions (D) arranged in a number (P+1) of rows and a number (Q) of columns, and the first and second photodiodes (PD1, PD2) of a $((p-1)\times Q+q)^{th}$ one of the photodetection cells 211 may be respectively disposed in the detection region (D) at a $p^{th}$ one of the rows and a $q^{th}$ one of the columns and the detection region (D) at a $(p+1)^{th}$ one of the rows and the $q^{th}$ one of the columns, where $1 \leq p \leq P$ and $1 \leq q \leq Q$.

Figure 11:
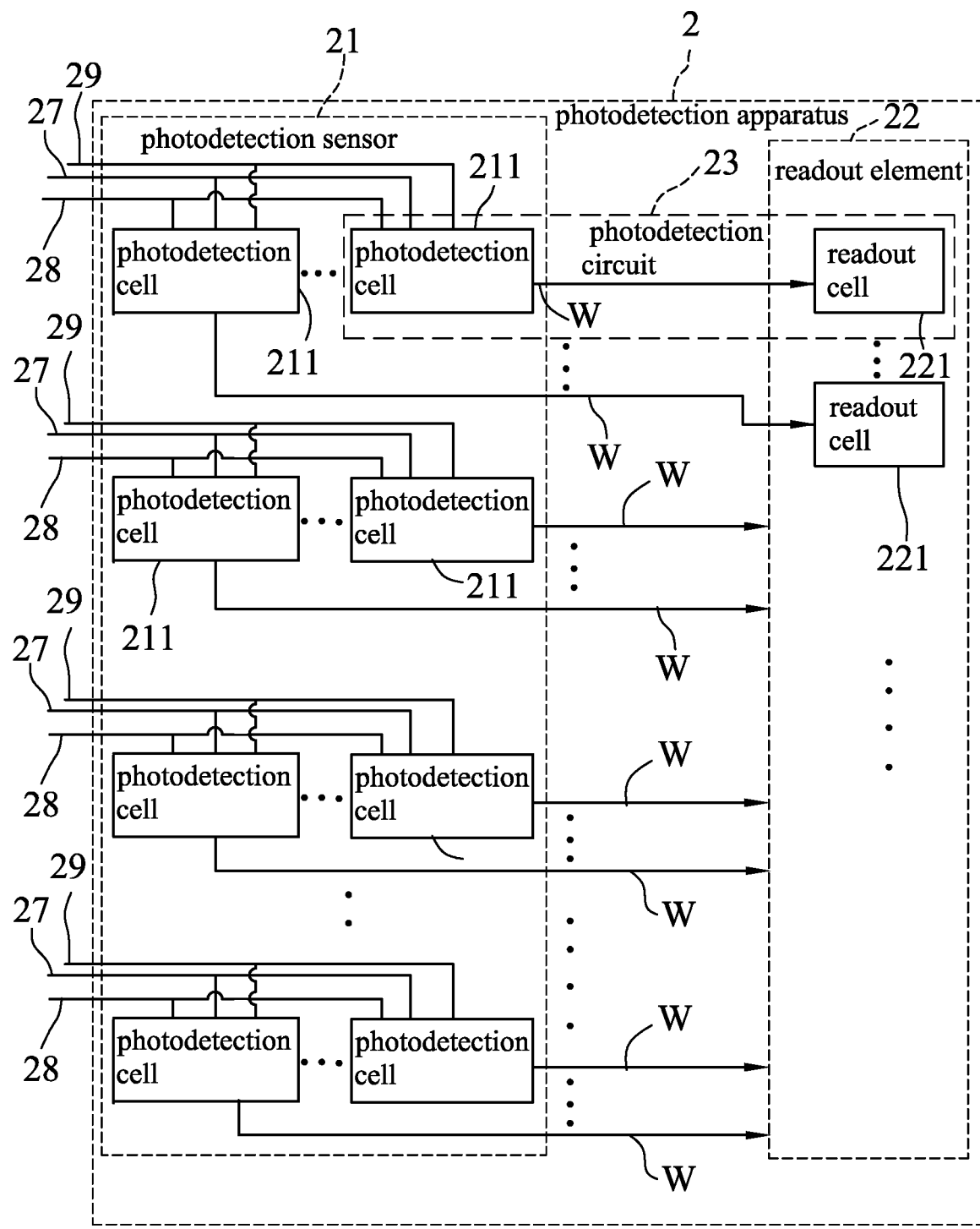
FIG. 11 is a block diagram illustrating a second embodiment of the photodetection apparatus according to the disclosure.
Figure 12:
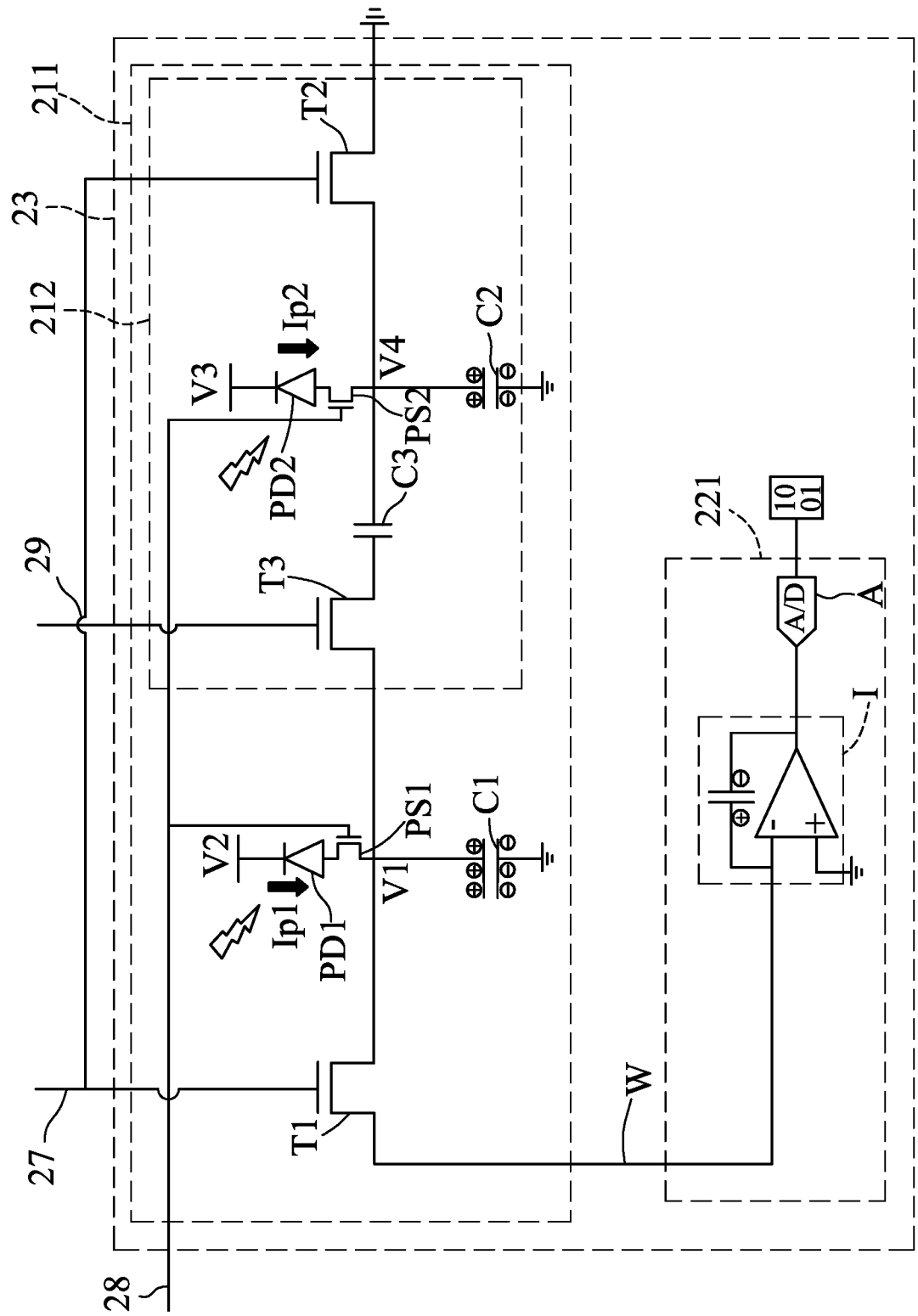
FIG. 12 is a circuit diagram illustrating a photodetection circuit of the second embodiment.

Referring to FIGS. 11 and 12, a second embodiment of the photodetection apparatus 2 according to the disclosure is similar to the first embodiment, and differs from the first embodiment in the configuration of the cancellation circuit 212 of each of the photodetection cells 211, and in that the photodetection cells 211 are controlled further via a number (P) of third control lines 29.

In the second embodiment, for each of the photodetection cells 211, the cancellation circuit 212 includes a second photodiode (PD2), a third switch (PS2), a second capacitor (C2), a fourth switch (T2), a fifth switch (T3) and a third capacitor (C3). The second photodiode (PD2) has an anode, and a cathode that is used to receive a reference voltage (V3). The third switch (PS2) (e.g., a TFT) has a first terminal that is coupled to the anode of the second photodiode (PD2), a second terminal, and a control terminal that is coupled to a corresponding one of the second control lines 28. The second capacitor (C2) is coupled between the second terminal of the third switch (PS2) and ground. The fourth switch (T2) (e.g., a TFT) is coupled between the second terminal of the third switch (PS2) and ground, and has a control terminal that is coupled to the control terminal of the second switch (T1). The fifth switch (T3) (e.g., a TFT) and the third capacitor (C3) are coupled in series between the second terminals of the first and third switches (PS1, PS2), with the fifth switch (T3) coupled to the second terminal of the first switches (PS1) and the third capacitor (C3) coupled to the second terminal of the third switch (PS2). The reference voltage (V3) is set in such a way that the second photodiode (PD2) is reversely biased, and operates in the photoconductive mode. The second photodiode (PD2) is used to receive the incident light, and converts the incident light received thereby into a second photocurrent (Ip2) that flows from its cathode to its anode and that has a positive magnitude correlated to illuminance of the incident light received thereby.

It should be noted that the photodetection cells 211 may be controlled via the first to third control lines 27-29 by a combination of a digital finite state machine (FSM) controller and a digital pulse width modulation (PWM) generator.

Figure 13:
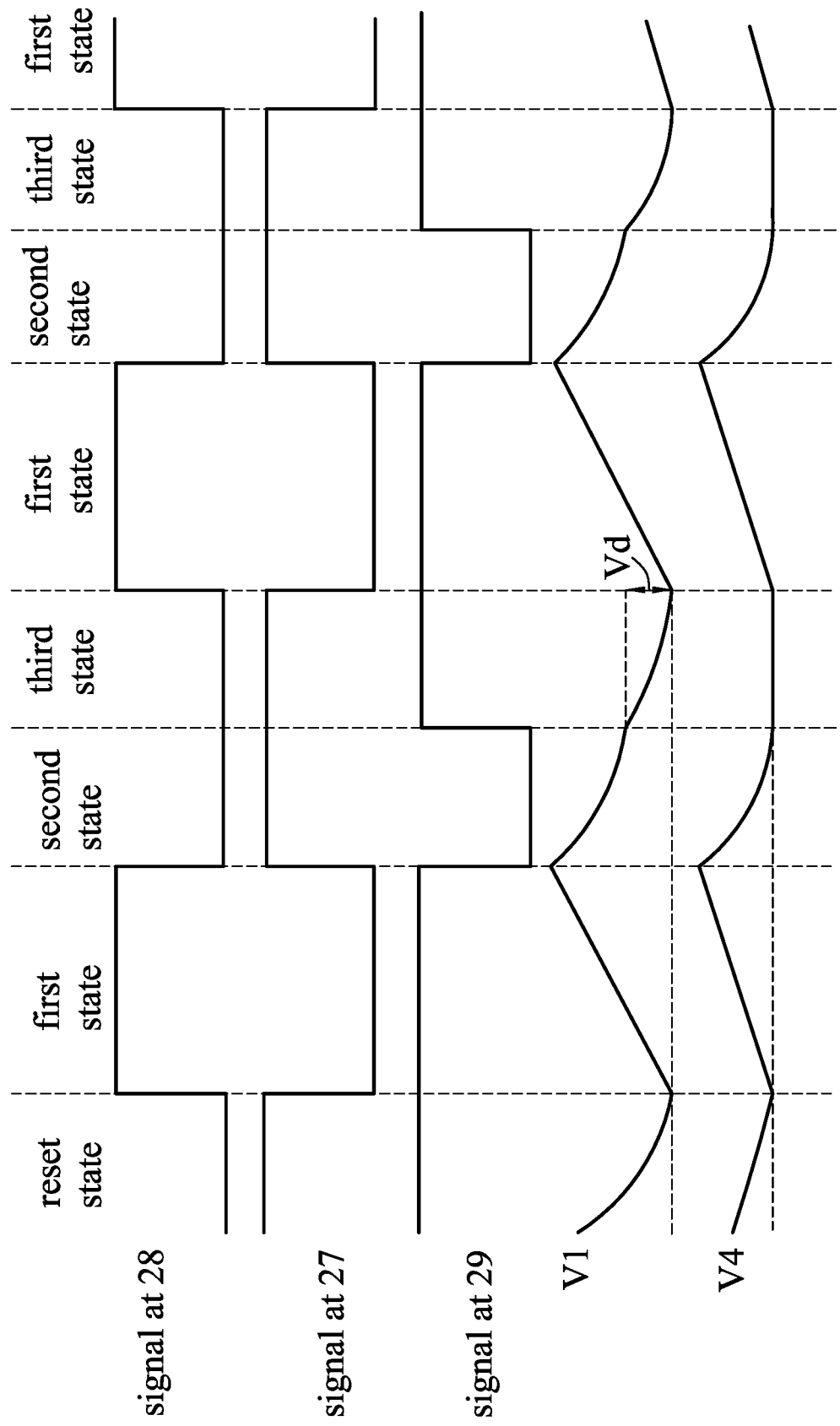
FIG. 13 is a timing diagram illustrating operations of the photodetection circuit of the second embodiment.

Referring to FIGS. 12 and 13, for each photodetection circuit 23, the photodetection cell 211 initially operates in a reset state (where the first and third switches (PS1, PS2) do not conduct while the second, fourth and fifth switches (T1, T2, T3) conduct), and then cyclically operates in a first state (where the first, third and fifth switches (PS1, PS2, T3) conduct while the second and fourth switches (T1, T2) do not conduct), a second state (where the first, third and fifth switches (PS1, PS2, T3) do not conduct while the second and fourth switches (T1, T2) conduct), and a third state (where the first and third switches (PS1, PS2) do not conduct while the second, fourth and fifth switches (T1, T2, T3) conduct). Operations of each photodetection circuit 23 in the aforesaid states when the first photocurrent (Ip1) is greater than the second photocurrent (Ip2) in magnitude are described below.

In the reset state, charges stored in the first to third capacitors (C1-C3), if any, are released via the conducting second, fourth and fifth switches (T1, T2, T3). At the end of the reset state, each of a voltage (V1) at the second terminal of the first switch (PS1) and a voltage (V4) at the second terminal of the third switch (PS2) has a magnitude equal to a reference value (e.g., zero).

In the first state, the first capacitor (C1) receives a rather large portion of the first photocurrent (Ip1) via the conducting first switch (PS1) to store charges; the third capacitor (C1) receives a rather small portion of the first photocurrent (Ip1) via the conducting first switch (PS1) to store charges; the second capacitor (C2) receives the second photocurrent (Ip2) via the conducting third switch (PS2), and further receives the rather small portion of the first photocurrent (Ip1), so as to store charges; the voltages (V1, V4) and a voltage across the third capacitor (C3) increase in magnitude; the residual electric quantity of the first capacitor (C1) is correlated to the magnitude of the first photocurrent (Ip1); a residual electric quantity of the second capacitor (C2) is correlated to the magnitude of the second photocurrent (Ip2); and a residual electric quantity of the third capacitor (C2) is correlated to the magnitude difference between the first and second photocurrents (Ip1, Ip2). A magnitude difference between the voltages (V1, V4) at the end of the first state is denoted as Vd.

In the second state, the first and second capacitors (C1, C2) discharge via the conducting second and fourth switches (T1, T2) and at substantially the same rate; the magnitude of the voltage (V1) decreases to a value equaling a sum of the reference value and Vd; and the magnitude of the voltage (V4) decreases to the reference value. At the end of the second state, the residual electric quantity of the first capacitor (C1) is correlated to the magnitude difference between the first and second photocurrents (Ip1, Ip2).

In the third state, the integrator (I) receives an output current provided by the first capacitor (C1) and a current provided by the third capacitor (C3) via the conducting second and fifth switches (T1, T3), and integrates the aforesaid currents to generate the integrated voltage; and the integrated voltage decreases in magnitude, and a magnitude variation thereof during the third state is correlated to a sum of the residual electric quantities of the first and third capacitors (C1, C3) at the end of the second state.

Operations of each photodetection circuit 23 in the aforesaid states when the first photocurrent (Ip1) is smaller than the second photocurrent (Ip2) in magnitude can be inferred from the description above, and details thereof are omitted for the sake of brevity.

Therefore, under the circumstance where the photodetection cell 211 operates in the third state, the digital output decreases when the first photocurrent (Ip1) is greater than the second photocurrent (Ip2) in magnitude, increases when the first photocurrent (Ip1) is smaller than the second photocurrent (Ip2) in magnitude, and a variation thereof during the third state is correlated to the magnitude difference between the first and second photocurrents (Ip1, Ip2). In this embodiment, a distance between the first and second photodiodes (PS1, PS2) is rather short, and therefore the component of the first photocurrent (Ip1) contributed by the background component of the incident light is substantially equal to a component of the second photocurrent (Ip2) contributed by the background component of the incident light, causing the variation of the digital output during the third state to be substantially irrelevant to the background component of the incident light.

Figure 14:
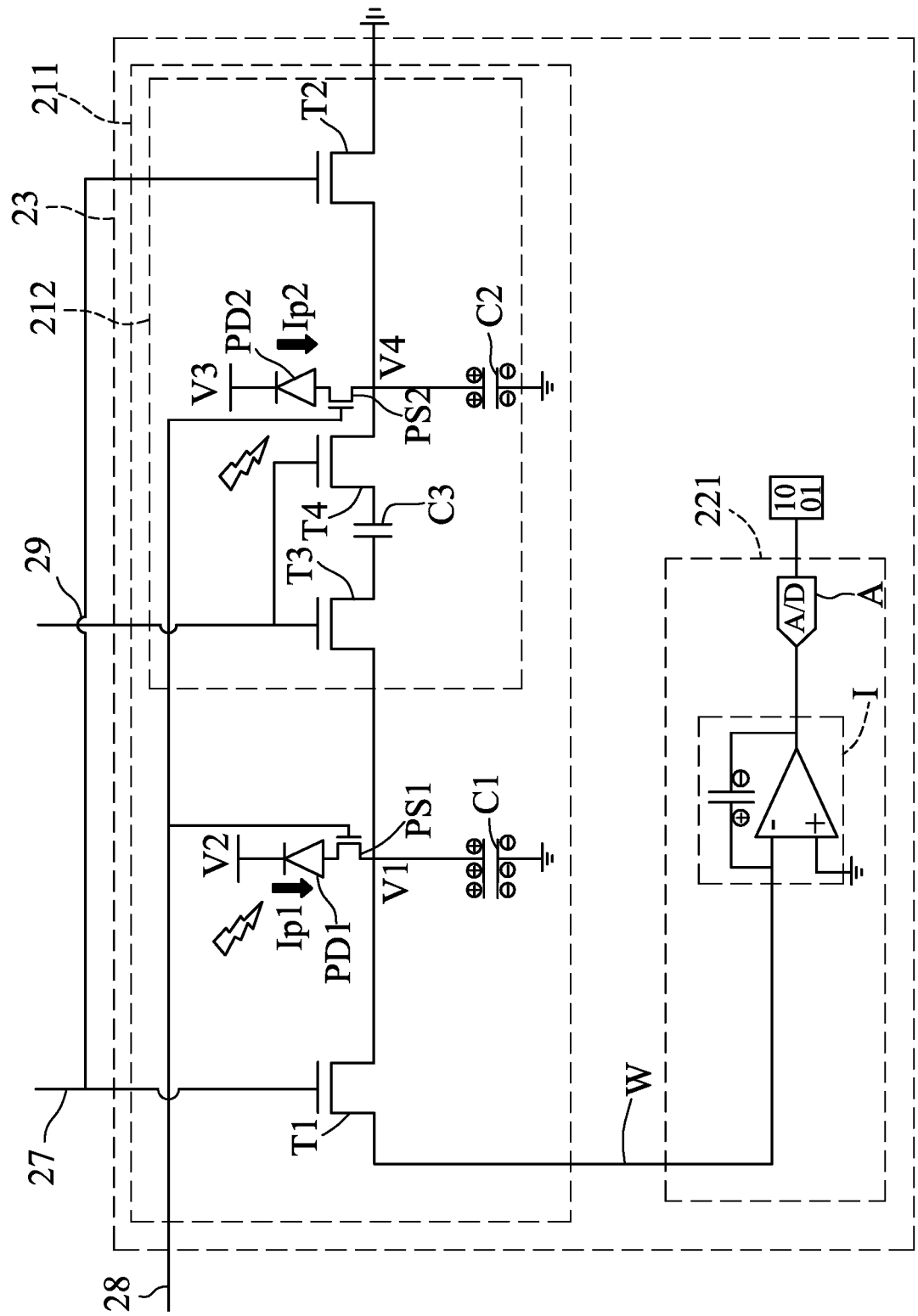
FIG. 14 is a circuit diagram illustrating a photodetection circuit of a third embodiment of the photodetection apparatus according to the disclosure.

Referring to FIGS. 11 and 14, a third embodiment of the photodetection apparatus 2 according to the disclosure is similar to the second embodiment, and differs from the third embodiment in that the cancellation circuit 212 of each of the photodetection cells 211 further includes a sixth switch (T4).

In the third embodiment, for each of the photodetection cells 211, the fifth switch (T3), the third capacitor (C3) and the sixth switch (T4) are coupled in series between the second terminals of the first and third switches (PS1, PS2), with the fifth switch (T3) coupled to the second terminal of the first switch (PS1) and the sixth switch (T4) coupled to the second terminal of the third switch (PS2). In addition, the sixth switch (T4) has a control terminal coupled to the control terminal of the fifth switch (T3), and the fifth and sixth switches (T3, T4) synchronously switch between conduction and non-conduction.

Figure 15:
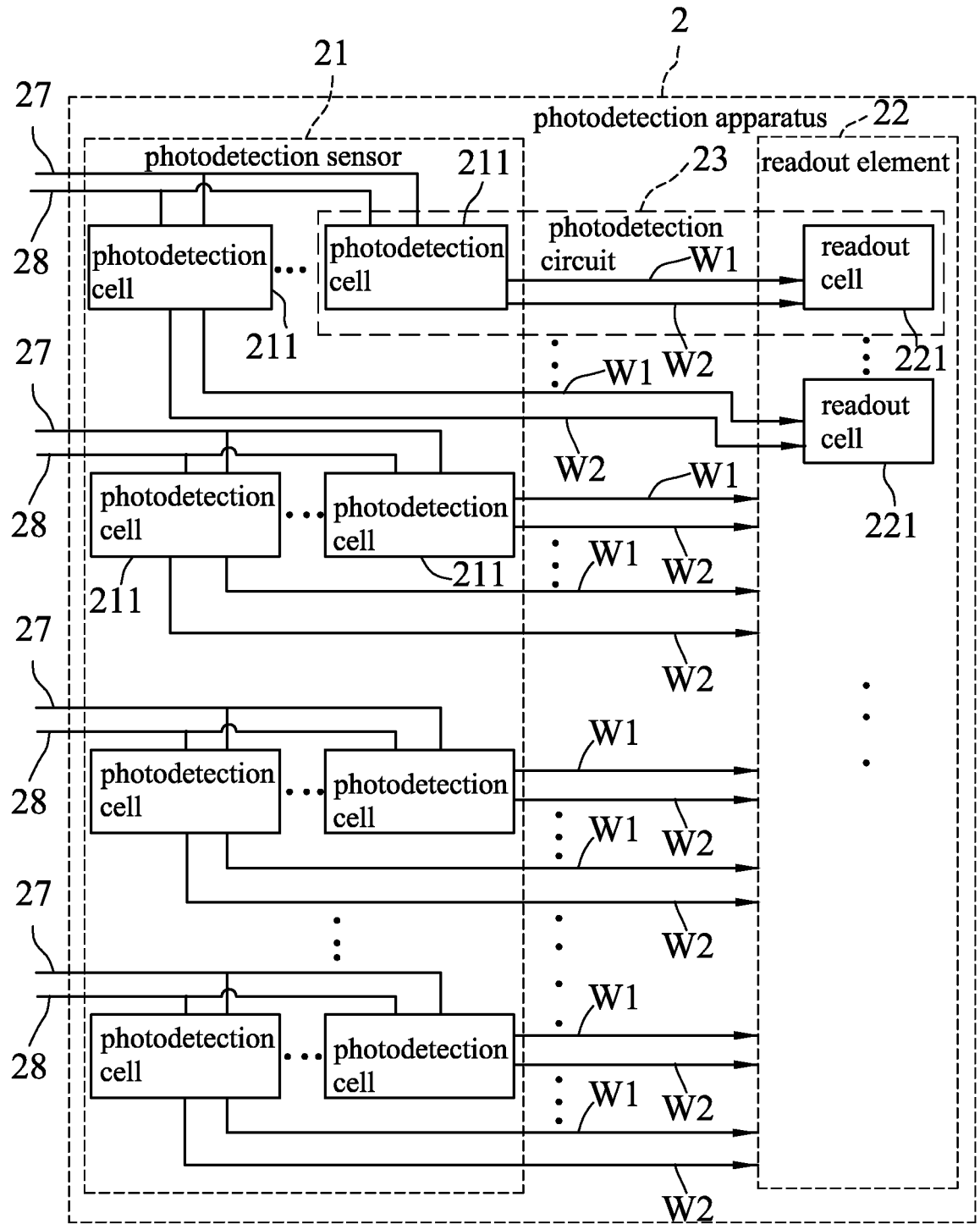
FIG. 15 is a block diagram illustrating a fourth embodiment of the photodetection apparatus according to the disclosure.

Referring to FIG. 15, a fourth embodiment of the photodetection apparatus 2 according to the disclosure is similar to the first embodiment, and differs from the first embodiment in that each of the photodetection cells 211 is coupled to the respective one of the readout cells 212 via a respective first connecting line (W1) and a respective second connecting line (W2), in the configuration of each of the photodetection cells 211, and in the configuration of each of the readout cells 221.

Figure 16:
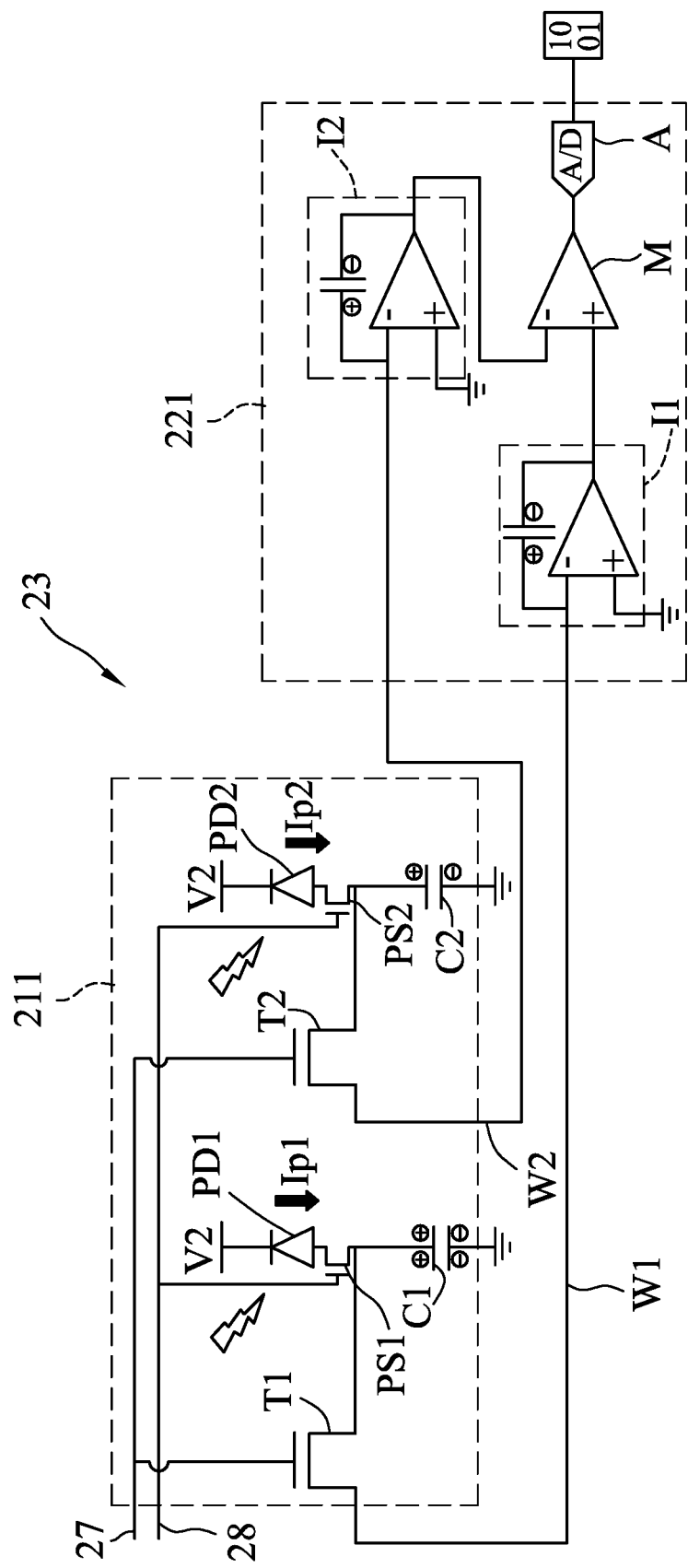
FIG. 16 is a circuit diagram illustrating a photodetection circuit of the fourth embodiment.

Referring to FIGS. 15 and 16, for each photodetection circuit 23, the photodetection cell 211 includes a first photodiode (PD1), a first switch (PS1), a first capacitor (C1), a second switch (T1), a second photodiode (PD2), a third switch (PS2), a second capacitor (C2) and a fourth switch (T2); and the readout cell 212 includes a first integrator (I1), a second integrator (I2), an amplifier (M) and an analog-to-digital converter (A). The first photodiode (PD1) has an anode, and a cathode that is used to receive a reference voltage (V2). The first switch (PS1) (e.g., a TFT) has a first terminal that is coupled to the anode of the first photodiode (PD1), a second terminal, and a control terminal that is coupled to a corresponding one of the second control lines 28. The first capacitor (C1) is coupled between the second terminal of the first switch (PS1) and ground. The second switch (T1) (e.g., a TFT) has a first terminal that is coupled to the second terminal of the first switch (PS1), a second terminal that is coupled to the respective first connecting line (W1), and a control terminal that is coupled to a corresponding one of the first control lines 27. The second photodiode (PD2) has an anode, and a cathode that is used to receive the reference voltage (V2). The third switch (PS2) (e.g., a TFT) has a first terminal that is coupled to the anode of the second photodiode (PD2), a second terminal, and a control terminal that is coupled to the control terminal of the first switch (PS1). The second capacitor (C2) is coupled between the second terminal of the third switch (PS2) and ground. The fourth switch (T2) (e.g., a TFT) has a first terminal that is coupled to the second terminal of the third switch (PS2), a second terminal that is coupled to the respective second connecting line (W2), and a control terminal that is coupled to the control terminal of the second switch (T1). The reference voltage (V2) is set up in such away so that the first and second photodiodes (PD1, PD2) are reversely biased and operate in the photoconductive mode. The first and second photodiodes (PD1, PD2) function similarly as those of the first embodiment. The first integrator (I1) is coupled to the respective first connecting line (W1), is for receiving a first output current provided by the first capacitor (C1), and integrates the first output current to generate a first integrated voltage. The second integrator (I2) is coupled to the respective second connecting line (W2), is for receiving a second output current provided by the second capacitor (C2), and integrates the second output current to generate a second integrated voltage. The amplifier (M) has a first input terminal (e.g., a non-inverting input terminal) that is coupled to the first integrator (I1) for receiving the first integrated voltage therefrom, a second input terminal (e.g., an inverting input terminal) that is coupled to the second integrator (I2) for receiving the second integrated voltage therefrom, and an output terminal that provides an amplified voltage. The analog-to-digital converter (A) is coupled to the output terminal of the amplifier (M) for receiving the amplified voltage therefrom, and converts the amplified voltage into a digital output.

In particular, for each photodetection circuit 23, the photodetection cell 211 cyclically operates in a first state (where the first and third switches (PS1, PS2) conduct while the second and fourth switches (T1, T2) do not conduct) and a second state (where the first and third switches (PS1, PS2) do not conduct while the second and fourth switches (T1, T2) conduct).

In the first state, the first capacitor (C1) receives the first photocurrent (Ip1) via the conducting first switch (PS1) to store charges; the second capacitor (C2) receives the second photocurrent (Ip2) via the conducting third switch (PS2) to store charges; a voltage at the second terminal of the first switch (PS1) has a magnitude that is positive and that is correlated to the magnitude of the first photocurrent (Ip1); a voltage at the second terminal of the third switch (PS2) has a magnitude that is positive and that is correlated to the magnitude of the second photocurrent (Ip2); a residual electric quantity of the first capacitor (C1) is correlated to the magnitude of the first photocurrent (Ip1); and a residual electric quantity of the second capacitor (C2) is correlated to the magnitude of the second photocurrent (Ip2).

In the second state, the first integrator (I1) receives the first output current from the first capacitor (C1) via the conducting second switch (T1), and integrates the first output current to generate the first integrated voltage; the second integrator (I2) receives the second output current from the second capacitor (C2) via the conducting fourth switch (T2), and integrates the second output current to generate the second integrated voltage; the first integrated voltage decreases in magnitude, and a magnitude variation thereof during the second state is correlated to the residual electric quantity of the first capacitor (C1) at the end of the first state; the second integrated voltage decreases in magnitude, and a magnitude variation thereof during the second state is correlated to the residual electric quantity of the second capacitor (C2) at the end of the first state; the amplified voltage has a magnitude that is smaller at the end of the second state than at the start of the second state when the magnitude variation of the first integrated voltage during the second state is greater than the magnitude variation of the second integrated voltage during the second state, and that is greater at the end of the second state than at the start of the second state when the magnitude variation of the first integrated voltage during the second state is smaller than the magnitude variation of the second integrated voltage during the second state; and a magnitude variation of the amplified voltage during the second state is correlated to a difference between the magnitude variation of the first integrated voltage during the second state and the magnitude variation of the second integrated voltage during the second state.

Therefore, under the circumstance where the photodetection cell 211 operates in the second state, the digital output decreases when the first photocurrent (Ip1) is greater than the second photocurrent (Ip2) in magnitude, increases when the first photocurrent (Ip1) is smaller than the second photocurrent (Ip2) in magnitude, and a variation thereof during the second state is correlated to the magnitude difference between the first and second photocurrents (Ip1, Ip2). In this embodiment, a distance between the first and second photodiodes (PS1, PS2) is rather short, and therefore a component of the first photocurrent (Ip1) contributed by the background component of the incident light is substantially equal to a component of the second photocurrent (Ip2) contributed by the background component of the incident light, causing the variation of the digital output during the second state to be substantially irrelevant to the background component of the incident light.

It should be noted that, in other embodiments, for each photodetection circuit 23, the first input terminal of the amplifier (M) may be an inverting input terminal; the second input terminal of the amplifier (M) may be a non-inverting input terminal; and under the circumstance where the photodetection cell 211 operates in the second state, the digital output may increase when the first photocurrent (Ip1) is greater than the second photocurrent (Ip2) in magnitude, and may decrease when the first photocurrent (Ip1) is smaller than the second photocurrent (Ip2) in magnitude.

Figure 17:
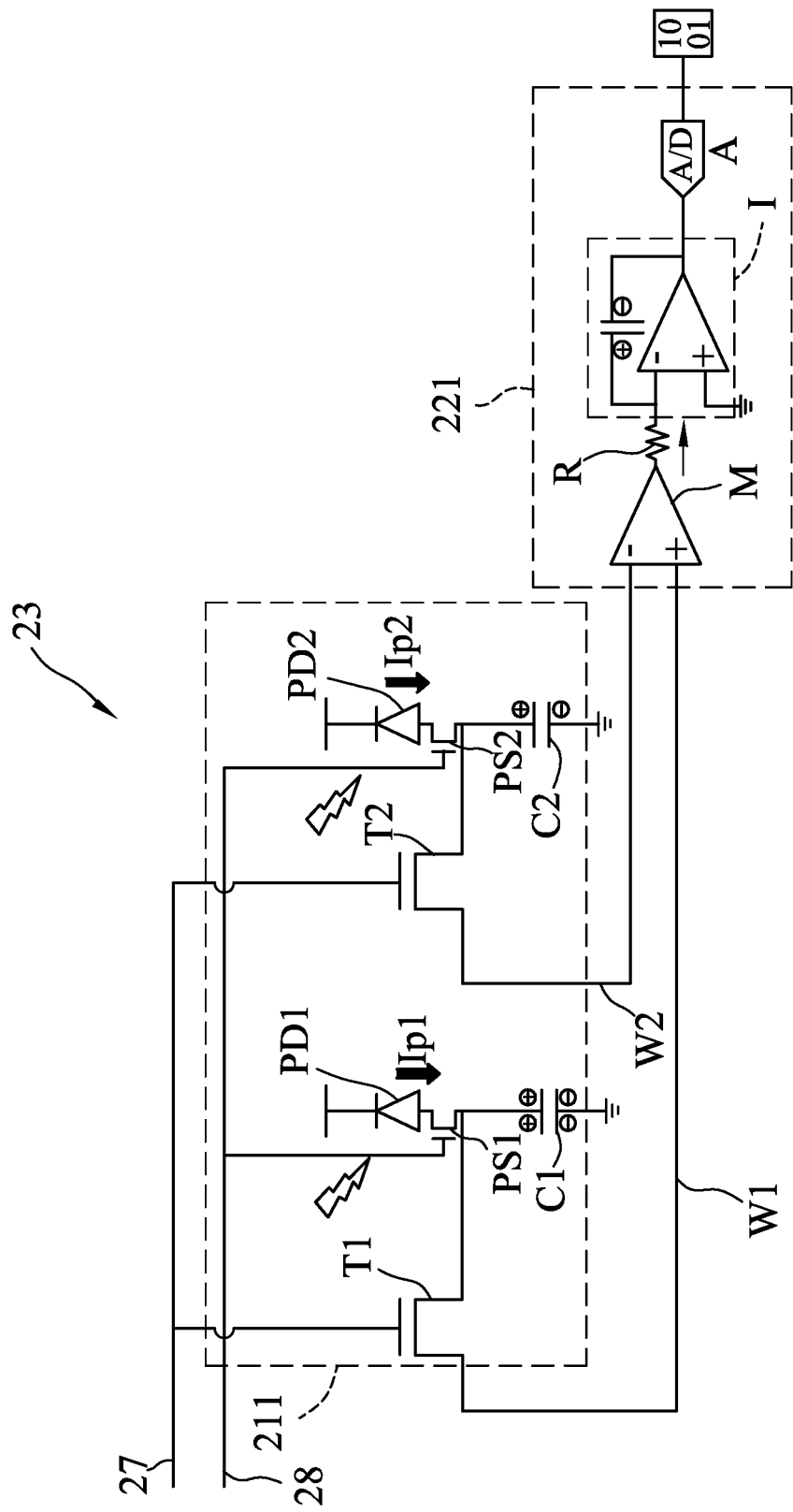
FIG. 17 is a circuit diagram illustrating a photodetection circuit of a fifth embodiment of the photodetection apparatus according to the disclosure.

Referring to FIGS. 15 and 17, a fifth embodiment of the photodetection apparatus 2 according to the disclosure is similar to the fourth embodiment, and differs from the fourth embodiment in the configuration of each of the readout cells 221.

In the fifth embodiment, for each photodetection circuit 23, the readout cell 221 includes an amplifier (M), a resistor (R), an integrator (I) and an analog-to-digital converter (A). The amplifier (M) has a first input terminal (e.g., a non-inverting input terminal) that is coupled to the respective first connecting line (W1), a second input terminal (e.g., an inverting input terminal) that is coupled to the respective second connecting line (W2), and an output terminal that provides an amplified voltage. The resistor (R) has a first terminal that is coupled to the output terminal of the amplifier (M) for receiving the amplified voltage therefrom, and a second terminal, and converts the amplified voltage into a converted current. The integrator (I) is coupled to the second terminal of the resistor (R) for receiving the converted current therefrom, and integrates the converted current to generate an integrated voltage. The analog-to-digital converter (A) is coupled to the integrator (I) for receiving the integrated voltage therefrom, and converts the integrated voltage into a digital output.

In particular, for each photodetection circuit 23, when the photodetection cell 211 operates in the second state, the first input terminal of the amplifier (M) receives the voltage at the second terminal of the first switch (PS1) via the conducting second switch (T1); the second input terminal of the amplifier (M) receives the voltage at the second terminal of the third switch (PS2) via the conducting fourth switch (T2); each of the amplified voltage and the converted current has a magnitude that is correlated to a value equaling the magnitude of the voltage at the second terminal of the first switch (PS1) minus the magnitude of the voltage at the second terminal of the third switch (PS2); the integrated voltage has a magnitude that decreases when the magnitude of the converted current is positive, and that increases when the magnitude of the converted current is negative; and a magnitude variation of the integrated voltage during the second state is correlated to an absolute value of the magnitude of the converted current.

Therefore, under the circumstance where the photodetection cell 211 operates in the second state, the digital output decreases when the first photocurrent (Ip1) is greater than the second photocurrent (Ip2) in magnitude, increases when the first photocurrent (Ip1) is smaller than the second photocurrent (Ip2) in magnitude, and a variation thereof during the second state is correlated to the magnitude difference between the first and second photocurrents (Ip1, Ip2). In this embodiment, the distance between the first and second photodiodes (PS1, PS2) is rather short, and therefore the component of the first photocurrent (Ip1) contributed by the background component of the incident light is substantially equal to the component of the second photocurrent (Ip2) contributed by the background component of the incident light, causing the variation of the digital output during the second state to be substantially irrelevant to the background component of the incident light.

It should be noted that, in other embodiments, for each photodetection circuit 23, the first input terminal of the amplifier (M) may be an inverting input terminal; the second input terminal of the amplifier (M) may be a non-inverting input terminal; and under the circumstance where the photodetection cell 211 operates in the second state, the digital output may increase when the first photocurrent (Ip1) is greater than the second photocurrent (Ip2) in magnitude, and may decrease when the first photocurrent (Ip1) is smaller than the second photocurrent (Ip2) in magnitude.

In view of the above, for each of the first to fifth embodiments, since the variation of the digital output during the second or third state is substantially irrelevant to the background component of the incident light, the photodetection apparatus 2 is substantially not susceptible to interference from the environmental light, and has a relatively large signal-to-noise ratio (SNR) even if the illuminance of the environmental light is high. Therefore, a device with the photodetection apparatus 2 has high photodetection precision even if the illuminance of the environmental light is high.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. A photodetection apparatus comprising a photodetection sensor, said photodetection sensor including at least one photodetection cell, each of said at least one photodetection cell including:
    a first photodiode having an anode and a cathode, used to receive incident light, and converting the incident light received thereby into a first photocurrent;
    a first switch having a first terminal that is coupled to said anode of said first photodiode, and a second terminal;
    a first capacitor coupled between said second terminal of said first switch and ground;
    a second switch having a first terminal that is coupled to said second terminal of said first switch, and a second terminal; and
    a cancellation circuit coupled to one of said anode of said first photodiode and said second terminal of said first switch, and including a second photodiode that is used to receive the incident light and that converts the incident light received thereby into a second photocurrent;
    said cancellation circuit cooperating with said first photodiode and said first and second switches to adjust a residual electric quantity of said first capacitor to a value correlated to a magnitude difference between the first and second photocurrents.

2. The photodetection apparatus of claim 1, wherein for each of said at least one photodetection cell, said second photodiode has an anode, and a cathode that is coupled to said anode of said first photodiode.

3. The photodetection apparatus of claim 2, wherein each of said at least one photodetection cell operates in one of a plurality of states that include:
    a first state where said first switch conducts while said second switch does not conduct; and
    a second state where said first switch does not conduct while said second switch conducts.

4. The photodetection apparatus of claim 2, wherein each of said first and second switches is a thin film transistor.

5. The photodetection apparatus of claim 1, wherein for each of said at least one photodetection cell, said second photodiode has an anode and a cathode, and said cancellation circuit further includes:
  a third switch having a first terminal that is coupled to said anode of said second photodiode, and a second terminal;
  a second capacitor coupled between said second terminal of said third switch and ground;
  a fourth switch coupled between said second terminal of said third switch and ground; and
  a fifth switch and a third capacitor coupled in series between said second terminals of said first and third switches.

6. The photodetection apparatus of claim 5, wherein each of said at least one photodetection cell operates in one of a plurality of states that include:
  a first state where said first, third and fifth switches conduct while said second and fourth switches do not conduct;
  a second state where said first, third and fifth switches do not conduct while said second and fourth switches conduct; and
  a third state where said first and third switches do not conduct while said second, fourth and fifth switches conduct.

7. The photodetection apparatus of claim 5, wherein each of said first to fifth switches is a thin film transistor.

8. The photodetection apparatus of claims, wherein for each of said at least one photodetection cell:
  said cancellation circuit further includes a sixth switch;
  said fifth switch, said third capacitor and said sixth switch are coupled in series between said second terminals of said first and third switches, with said fifth switch coupled to said second terminal of said first switch and said sixth switch coupled to said second terminal of said third switch.

9. The photodetection apparatus of claim 8, wherein each of said at least one photodetection cell operates in one of a plurality of states that include:
  a first state where said first, third, fifth and sixth switches conduct while said second and fourth switches do not conduct;
  a second state where said first, third, fifth and sixth switches do not conduct while said second and fourth switches conduct; and
  a third state where said first and third switches do not conduct while said second and fourth to sixth switches conduct.

10. The photodetection apparatus of claim 8, wherein each of said first to sixth switches is a thin film transistor.

11. The photodetection apparatus of claim 1, further comprising a readout element, said readout element including at least one readout cell, each of said at least one readout cell being coupled to said second terminal of said second switch of a respective one of said at least one photodetection cell, being for receiving an output current provided by said first capacitor of said respective one of said at least one photodetection cell, integrating the output current to generate an integrated voltage, and converting the integrated voltage into a digital output.

12. The photodetection apparatus of claim 11, wherein each of said at least one readout cell includes:
  an integrator coupled to said second terminal of said second switch of said respective one of said at least one photodetection cell, for receiving the output current, and integrating the output current to generate the integrated voltage; and
  an analog-to-digital converter coupled to said integrator for receiving the integrated voltage therefrom, and converting the integrated voltage into the digital output.

13. A photodetection apparatus comprising:
  a photodetection sensor including at least one photodetection cell, each of said at least one photodetection cell including
    a first photodiode having an anode and a cathode, used to receive incident light, and converting the incident light received thereby into a first photocurrent,
    a first switch having a first terminal that is coupled to said anode of said first photodiode, and a second terminal,
    a first capacitor coupled between said second terminal of said first switch and ground;
    a second switch having a first terminal that is coupled to said second terminal of said first switch, and a second terminal,
    a second photodiode having an anode and a cathode, used to receive the incident light, and converting the incident light received thereby into a second photocurrent,
    a third switch having a first terminal that is coupled to said anode of said second photodiode, and a second terminal,
    a second capacitor coupled between said second terminal of said third switch and ground, and
    a fourth switch having a first terminal that is coupled to said second terminal of said third switch, and a second terminal; and
  a readout element including at least one readout cell, each of said at least one readout cell being coupled to said second terminals of said second and fourth switches of a respective one of said at least one photodetection cell, and generating a digital output related to a magnitude difference between the first and second photocurrents of said respective one of said at least one photodetection cell.

14. The photodetection apparatus of claim 13, wherein each of said at least one readout cell includes:
  a first integrator coupled to said second terminal of said second switch of said respective one of said at least one photodetection cell, for receiving a first output current provided by said first capacitor of said respective one of said at least one photodetection cell, and integrating the first output current to generate a first integrated voltage;
  a second integrator coupled to said second terminal of said fourth switch of said respective one of said at least one photodetection cell, for receiving a second output current provided by said second capacitor of said respective one of said at least one photodetection cell, and integrating the second output current to generate a second integrated voltage;
  an amplifier having a first input terminal that is coupled to said first integrator for receiving the first integrated voltage therefrom, a second input terminal that is coupled to said second integrator for receiving the second integrated voltage therefrom, and an output terminal that provides an amplified voltage; and
  an analog-to-digital converter coupled to said output terminal of said amplifier for receiving the amplified voltage therefrom, and converting the amplified voltage into the digital output.

15. The photodetection apparatus of claim 13, wherein each of said at least one readout cell includes:
- an amplifier having a first input terminal that is coupled to said second terminal of said second switch of said respective one of said at least one photodetection cell, a second input terminal that is coupled to said second terminal of said fourth switch of said respective one of said at least one photodetection cell, and an output terminal that provides an amplified voltage;
- a resistor having a first terminal that is coupled to said output terminal of said amplifier for receiving the amplified voltage therefrom, and a second terminal, and converting the amplified voltage into a converted current;
- an integrator coupled to said second terminal of said resistor for receiving the converted current therefrom, and integrating the converted current to generate an integrated voltage; and
- an analog-to-digital converter coupled to said integrator for receiving the integrated voltage therefrom, and converting the integrated voltage into the digital output.

16. The photodetection apparatus of claim 13, wherein each of said first to fourth switches is a thin film transistor.

\* \* \* \* \*